US009600443B2

(12) United States Patent
Albano et al.

(10) Patent No.: US 9,600,443 B2
(45) Date of Patent: Mar. 21, 2017

(54) TRACKING ENTITIES BY MEANS OF HASH VALUES

(71) Applicant: International Business Machines Corporation, Armonk, NY (US)

(72) Inventors: Gherardo Albano, Rome (IT); Dario De Judicibus, Rome (IT)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 13/740,420

(22) Filed: Jan. 14, 2013

(65) Prior Publication Data

US 2013/0197859 A1 Aug. 1, 2013

(30) Foreign Application Priority Data

Jan. 30, 2012 (EP) .................................. 12152991

(51) Int. Cl.
*G01C 9/00* (2006.01)
*G06F 17/13* (2006.01)
(Continued)

(52) U.S. Cl.
CPC ......... *G06F 17/13* (2013.01); *G06K 9/00369* (2013.01); *G06K 9/00771* (2013.01); *G07C 1/10* (2013.01)

(58) Field of Classification Search
CPC G06F 17/13; G06K 9/00369; G06K 9/00771; G07C 1/10
(Continued)

(56) References Cited

U.S. PATENT DOCUMENTS 6,507,912 B1  1/2003  Matyas, Jr. et al.
6,687,375 B1 *  2/2004  Matyas, Jr. ........... H04L 9/0866
380/30

(Continued)

FOREIGN PATENT DOCUMENTS

EP        1 635 503 A2     3/2006
WO   WO 03/053123 A2    7/2003
WO   WO 2007/036763 A1   4/2007

OTHER PUBLICATIONS

Giuseppe Lo Re et al, Secure Random Number Generation in Wireless Sensor Networks, Nov. 14-19, 2011, SIN '11, p. 175-182.*

(Continued)

*Primary Examiner* — John Breene
*Assistant Examiner* — Stephanie Bloss
(74) *Attorney, Agent, or Firm* — Stephen J. Walder, Jr.; Richard A. Wilhelm

(57) ABSTRACT

Mechanisms for tracking an entity are provided. A time is determined by a sensor having a clock, the time being within a time slot in a series of time slots. First data of the time slot is provided and shared between a plurality of sensors. The sensor receives data from the movable entity. The sensor calculates identifying data from the received data for identifying the entity. Derivative identifying data is calculated by applying a modifying function using the provided first data for modifying the identifying data. The sensor calculates a hash value by taking the derivative identifying data as input. The sensor sends a message to a central server for determining the position of the entity, the message comprising the hash value and an identifier of the sensor.

21 Claims, 3 Drawing Sheets

(51) Int. Cl.
*G06K 9/00* (2006.01)
*G07C 1/10* (2006.01)

(58) Field of Classification Search
USPC .......................................................... 702/150
See application file for complete search history.

(56) References Cited

U.S. PATENT DOCUMENTS

| | | | |
|---|---|---|---|
| 6,850,252 B1* | 2/2005 | Hoffberg | G06K 9/00369 |
| | | | 348/E7.061 |
| 7,188,362 B2 | 3/2007 | Brandys | |
| 7,761,715 B1 | 7/2010 | Califano et al. | |
| 2003/0005310 A1 | 1/2003 | Shinzaki | |
| 2007/0180261 A1 | 8/2007 | Akkermans et al. | |
| 2007/0180262 A1* | 8/2007 | Benson | G07B 17/00508 |
| | | | 713/186 |
| 2007/0226512 A1 | 9/2007 | Kevenaar et al. | |
| 2011/0113037 A1* | 5/2011 | Wessling | G06F 17/30743 |
| | | | 707/747 |
| 2012/0249802 A1* | 10/2012 | Taylor | G06T 7/0081 |
| | | | 348/169 |
| 2012/0250984 A1* | 10/2012 | Taylor | G06T 7/0081 |
| | | | 382/162 |

OTHER PUBLICATIONS

"Hash Function", Wikipedia, http://en.wikipedia.org/wiki/Hash_function, last modified on Nov. 18, 2012, accessed on Nov. 21, 2012, 12 pages.

Barni Mauro et al., "A Privacy-compliant Fingerprint Recognition System Based on Homomorphic Encryption and Fingercode Templates", 2010 Fourth IEEE International Conference on Biometrics: Theory Applications and Systems (BTAS), Sep. 27-29, 2010, pp. 1-7.

Kourennyi, Dmitri D., "Customer Tracking Through Security Camera Video Processing", Department of Electrical Engineering and Computer Science, Case Western Reserve University, Jan. 2011, 34 pages.

Swarupa, N.V.S.L. et al., "Face Recognition System", 2010 International Journal of Computer Applications (0975-8887), vol. 1—No. 29, 2010, pp. 36-41.

* cited by examiner

TRACKING ENTITIES BY MEANS OF HASH VALUES

BACKGROUND

The invention relates to the field of data processing, and more particularly to the field of tracking movable entities.

Biometric data such as fingerprints, face prints, iris scan data and the like are collected for a plurality of purposes ranging from the provision of security services to the tracking of customers in a shop. Privacy laws in many countries mandate that personal data and biometric data are only allowed to be acquired if a number of security constraints are met. That creates problems in respect to collecting data and further processing them for business purposes.

In order to prevent conflicts with existing data privacy laws, biometric data collected, for example, for prospecting customers in a store by profiling cameras, are processed inside the cameras in a secure way ensuring that the data never leaves the camera. The profiling cameras provide as output, not the original image data, but only generalized profile data like gender, age range, or ethnic group. This profile data, in general, in compliance with privacy laws, is not able to be used as an identification of a particular person. However, this profile data is not fine-grained enough for allowing personalized data acquisition and evaluation, for example, to track customer movements and analyze cause-effect situations.

SUMMARY

In one illustrative embodiment, a computer-implemented method for tracking at least one movable entity is provided. The method comprises determining a current time by a first one of one or more sensor devices, each of said sensor devices having a clock for determining the current time, the current time lying within a first time slot, the first time slot being one of a series of time slots, the clocks of all sensor devices being synchronized, the series of time slots being shared by all the sensor devices. The method further comprises providing first data, the first data being particular to the first time slot and being shared between all first time slots of the sensor devices. The method also comprises receiving by the first sensor device a set of data, the set of data being received from the at least one movable entity. In addition, the method comprises calculating by said first sensor device identifying data from the received set of data for identifying the at least one entity by means of said identifying data. Moreover, the method comprises calculating derivative identifying data by applying a modifying function on the identifying data, the modifying function using the identifying data as first input value and using the provided first data as a second input value for modifying the identifying data. Furthermore, the method comprises calculating by said first sensor device a first hash value by taking the derivative identifying data as input, the first hash value being calculated by applying a hash function. Also, the method comprises sending a message from the first sensor device to a central server for determining the position of the at least one movable entity, the message comprising the hash value and an identifier of the first sensor device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, illustrative embodiments of the invention will be described in greater detail by way of example only, making reference to the drawings in which.

DETAILED DESCRIPTION

Figure 1:
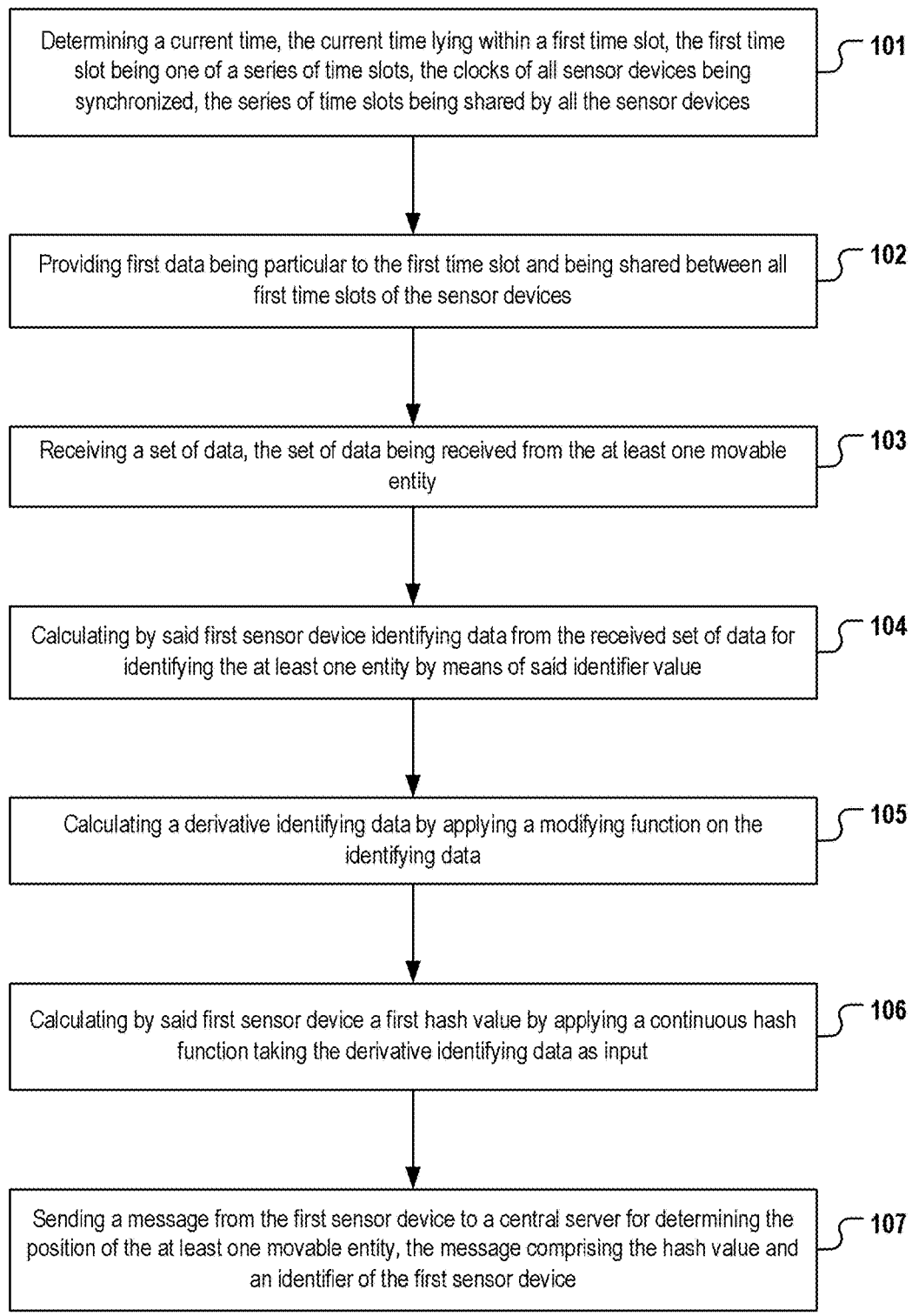
FIG. 1 is a flowchart outlining an illustrative embodiment.

It is an objective of the invention to provide for an improved computer implemented method, computer system, sensor device and computer program product for tracking at least one movable entity. The objective is solved by the features of the independent claims. Preferred embodiments are given in the dependent claims. If not explicitly stated otherwise, embodiments of the invention can be combined freely.

A 'computer readable medium' may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing.

A 'movable entity' as used herein may be any entity whose location may change over time (due to active or passive movement). In particular, the movable entity may be a human being or any other object from which a set of data may be collected by one or more sensor devices. If a particular one of the sensor devices is operable to 'sense' and receive, the set of data may depend on the position of the movable entity relative to the sensor device at a particular moment in time.

The 'set of data' as used herein is any kind of data, in particular biometric data of a human or data allowing to identify an object, e.g., a serial number, which can be gathered by a sensor device from a movable entity. According to some illustrative embodiments, the set of data comprises data which can be used for identifying a human being or a specific object and which therefore needs to be protected from unauthorized access according to data protection rules of some companies and/or countries. Depending on the embodiment, the set of data may comprise, for example, an image, data specifying the two- or three-dimensional shape of the movable entity, acoustic information, keyboard input pattern information, vibrations on the floor caused by a characteristic stepping pattern of a human, a picture of a number plate of a car, etc.

A 'sensor device' as used herein is any device being operable to collect the set of data from one or more movable entities by means of a sensing functionality. Depending on the embodiment, a sensor device may be a camera, a fingerprint sensor, a microphone, a vibration sensor, or the like.

'First data' as used herein is any data being particular to a first time slot of a series of time slots. The first data is shared between all first time slots of all the sensor devices.

A 'thermal print' as used herein is a temperature pattern of an organism being characteristic for a particular individual and allowing the identification of the individual.

'Identifying data' as used herein is any kind of data having been derived from the set of data and being usable as biometric identifier for identifying the movable entity the set of data was derived from. In contrast to the set of data as originally received, the identifying data typically is of reduced size as it comprises only, or predominantly, those parts of the set of data which are characteristic for the movable entity. For example, a set of data being an image of a face of a human may be used for calculating a face print (the identifying data). The face print typically does not comprise information which is considered as not helpful for identifying a particular person, e.g., the brightness of the face, because this information can change in dependence on the illumination of the environment. The face print may comprise, however, features such as the eye distance, the distance of the chin to the nose, the size of the eyes, etc. which are considered as characteristic—alone or in combination with other features—for a particular movable entity. Therefore, the data value(s), having been derived from the originally received set of data, is herein referred to as 'identifying data'. The algorithm used for calculating the identifying data may vary in dependence on the kind of data originally retrieved. For example, the algorithm for calculating a face print from a pixel-image of a human face received by a camera will differ from an algorithm calculating a voice profile from a set of voice data received by a microphone.

A 'modifying function' as used herein is any mathematical function that alters a first input value by means of one or more second input values without removing from the first input value information needed for subsequent processing of the first input value. In case the identifying data is used as a biometric identifier of a particular person, a modifying function is any mathematical function taking the identifying data as first input value and modifying the identifying data by means of one or more second input values in a way that the following relation holds true: in case the modifying function is applied on two or more first input values for respectively calculating an output value, the similarities and dissimilarities of the first input values is preserved and corresponds to the similarities and dissimilarities of the respectively calculated output values, provided that the same one or more second input values were used by the modifying function for generating the respective output value. Thus, the different derivative identifying data can be compared in place of the original identifying data.

If the one or more second input values are not known any more, a restoration of the original identifying data is not possible. In addition, it is in this case not possible to calculate new derivative identifying data whose similarity to a previously calculated derivative identifying data (calculated based on the now unknown second input value(s)) correlates with the similarity of the originally gathered set of data. According to some embodiments, wherein the first input data is a face print of a person, any parameter values of the face print are altered in a coherent way. For example, the dimensions of the eyes may be stretched, the face of the person and all its components maybe enlarged, or the like. Provided that all cameras apply the same modifying function and the same second input values, the same or at least a highly similar derivative face print will be calculated for one particular person photographed multiple times by multiple different cameras.

A 'hash function' as used herein is any algorithm or subroutine that maps large data sets to smaller data sets. The values returned by a hash function are called hash values. A hash function as used herein is referentially transparent, i.e. if called twice on input that is "equal" (e.g., strings that consist of the same sequence of characters), it will give the same result. A 'continuous hash function' as used herein is any hash function mapping two input values that differ by a little to two hash values, the two hash values being equal or nearly equal hash values. Thus, the degree of similarity of the input values of a continuous hash function corresponds to the degree of similarity of the resulting hash values. The term 'synchronization' as used herein is to be understood in its broadest possible way: any computer-implemented functionality causing a particular piece of data to be available ('shared') to any one of a set of synchronized entities (e.g., sensor devices) will, in the following, be referred to as synchronization.

Computer program code for carrying out operations for aspects of the illustrative embodiments of the present invention may be written in any combination of one or more programming languages, including an object oriented programming language such as Java, Smalltalk, C++ or the like and conventional procedural programming languages, such as the "C" programming language or similar programming languages including CPU (Central Processing Unit) assembler language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one aspect, an illustrative embodiment of the invention relates to a computer-implemented method for tracking at least one movable entity. The method comprises:

a) determining a current time by a first one of one or more sensor devices, each of the sensor devices having a clock for determining the current time, the current time lying within a first time slot, the first time slot being one of a series of time slots, the clocks of all sensor devices being synchronized, the series of time slots being shared by all the sensor devices;

b) providing first data, the first data being particular to the first time slot and being shared between all first time slots of the sensor devices;

c) receiving by the first sensor device a set of data, the set of data being received from the at least one movable entity;

d) calculating by the first sensor device identifying data from the received set of data for identifying the at least one entity by means of the identifying data;

e) calculating derivative identifying data by applying a modifying function on the identifying data, the modifying function using the identifying data as first input value and using the provided first data as a second input value for modifying the identifying data;

f) calculating by the first sensor device a first hash value by taking the derivative identifying data as input, the first hash value being calculated by applying a hash function;

g) sending a message from the first sensor device to a central server for indicating the position of the at least one movable entity, the message comprising the hash value and an identifier of the first sensor device.

The features may be advantageous because, if executed by a sensor device, the steps provide for a sensor device operable to protect sensitive biometric data 'sensed', i.e., 'received' by the sensor device from a movable entity, from leaving the sensor device. A central server computer receiving the message comprising a hash value, having been generated as described, is enabled to use the information to create a movement path of the movable entity without being at any moment able to identify the movable entity. Thus, the received set of data, typically sensitive biometric data, is never stored outside the sensor device. In a further advantageous aspect, sending the message to the central server device is very efficient as a hash value is only a fraction of the size of the original set of data (e.g., image data or voice data) and is typically also much smaller than the identifying data (e.g., a face print, finger print, voice profile) having been generated from the originally received set of data. All derivative identifying data calculated by any one of a plurality of sensor devices for the same time slot and the same identifying data are the same. This is because the first data and the time slot series are shared by all sensor devices.

According to some illustrative embodiments, the steps a), c), d), e), f) and g) are executed by a first one of the one or more sensor devices. Depending on the embodiment, step b) may be executed by the first sensor device, another sensor device or the central server: one of the sensor devices or the central server may generate the first data, or a series of first data, and submit the first data to the other sensor devices and optionally also the central server. According to some embodiments, the first data of the time slot and/or a series of first data corresponding to a sequence of time slots in a time series are created by the central server and sent to each of the sensor devices, thereby synchronizing the time slots and the slot-specific first data between the central server and each of the sensor devices. According to other embodiments, the first data or the series of first data is created by one of the sensor devices and sent to any of the other sensor devices and optionally also to the central server.

According to further embodiments, the method comprises a step of determining, by the first sensor device, if a derivative identifier value has already been calculated for a given movable entity by the sensor device within a pre-defined period of time. If so, the set of data is not processed for calculating the hash value more than once in the time period (this period of time may deviate from the length of a time slot). Cameras such as the SEKS204 already come with some means for determining if a particular set of images, e.g., images of a face, have been taken from the same face or from a different face. The existing functionality may be employed to avoid calculating a hash value for each and every raw image (or other kind of received data set) having been received for the same person.

According to embodiments, the message further comprises a timestamp information being indicative of the moment in time of receiving the set of data, e.g., the moment in time when a picture is taken by a camera acting as a sensor device. This may be advantageous as the timestamp allows tracking the movement of the movable entity with a high time resolution. According to embodiments wherein no timestamp information is contained in the message, the central server may use the series of time slots synchronized between the central server and each of the sensor devices for tracking the movement of the movable entity on a more coarse grained time scale, wherein each time frame is considered as one moment in time.

According to further embodiments, the message further comprises a dwell time of the movable entity. A 'dwell time' is a time period during which the movable entity was observed to be located in a particular position covered by the sensor device. The dwell time is automatically determined by the sensor device. For example, some cameras, e.g., the SEKS204 can determine if one single person or two different persons in sequence are residing in front of the camera, thereby determining the dwell time for the person. The information may improve the quality of the tracking path to be assembled by the tracking module of the central server.

According to embodiments, the method further comprises a step of encrypting the message before sending the message to the central server. This may be advantageous as an extra level of security is provided for protecting the hash values during transmission to the server computer from unauthorized access.

According to embodiments the hash function is a continuous hash function. Using a continuous hash function is advantageous as the set of data and the identifying value derived therefrom may slightly vary between different sensor devices and/or between different moments in time even when the set of data is taken from one and the same person. This is because the position (distance and/or angle) of the person relative to sensor device, the illumination and other factors may vary. In some case the set of data is received by the sensor device via its sensor unit only partially. The partially collected data is then completed by executing an algorithm by a processor of the sensor device. For example, a human head taken by three quarters can be elaborated to calculate a complete, frontal image of face. It should be noted that continuity is usually considered a fatal flaw for checksums, cryptographic hash functions, and other related concepts as the security level provided by the hash function is flawed. Using a continuous hash function allows comparing statistically similar results. Using a modification function before the hashing, however, provides sufficient security as to allow using a continuous hash function for improving the accuracy of a tracking algorithm operating on the central server computer.

According to embodiments the hash function is a continuous acoustic fingerprint algorithm. According to embodiments the method further comprises, for k time slots succeeding the current time slot in the series of time slots, k being an integer larger than 1, the following steps:

determining one of the k second time slots, the determined second time slot directly preceding a current time;

providing other first data, the other first data being particular to the determined second time slot and being shared between the sensor devices;

calculating a second derivative identifying data by applying a modifying function on the identifying data, the modifying function using the identifying data as first input value and using the provided other first data as a second input value for modifying the identifying data;

calculating by the first sensor device a second hash value by taking the second derivative identifying data as input, the second hash value being calculated by applying the hash function;

storing the first and each of the k second hash values on a storage medium being integral part of the first sensor device. Preferentially, the storage medium is a secure, e.g. encrypted or otherwise protected, storage medium.

In addition, the first, and each of the k second, hash values may be sent to the central server within one single message, the message being indicative of the k second hash values having been derived from one and the same received set of data. The features may be advantageous as for one and the same set of data, a plurality (f*(k+1)) of hash values may be calculated, wherein f is the number of hash values calculated for a particular time slot assuming the number being constant for all time slots. Thus, it is possible to calculate multiple hash values for the same set of data by the same sensor device. This allows the path assembly module to find matches across different, typically adjacent, time slots. According to some illustrative embodiments, a specific event can reset the first data assigned to corresponding time slots so that first data having already been used for a previous time slot is used again as first data in a current time slot (it has to be ensured, however, that during the validity time of a series of time slots, each first data being particular to one of the time slots is unique). For example, the receipt of the set of data by a specific sensor device, the lapse of a predefined delay time after having generated the first data, or at a specific time of the day may trigger a reset.

According to some illustrative embodiments the first data is first random data and the step of providing the first data comprises the steps of executing a random function on the first sensor device; the other first data of one of the k second time slots may be a second random data, and the step of providing the other first data may comprise the step of executing the random function by the first sensor device.

According to some illustrative embodiments, the data being particular to each time slot is unique in respect to the data values particular to any of the time slots of the time slot series. This may prevent the generation of identical hash values from two sets of data having been received in different time slots.

According to some illustrative embodiments, the random function uses an indication of the first time slot in combination with the received set of data or a derivative value of the set of data as input for calculating the first random data as a unique random number. Analogously, the random function uses an indication of the second time slot in combination with the received set of data or a derivative value of the set of data as input for calculating the second random data as a unique random number. The indication of the first or second time slot may be, for example, the starting or ending time of the time slot in combination with the current date or any other data value guaranteed to be unique within the series of time slots.

According to embodiments, steps c)-g) are repeated multiple times during the first time slot. The features may be advantageous as, for example, the position of a particular person may be determined multiple times during the time slot, thereby allowing for the submission of a greater number of hash values and for increasing the accuracy of a path assembly algorithm running on the server receiving the messages. The hash values received by the central server during a given time slot may stem from data sets collected from the same or from different movable entities. Depending on the embodiments, the set of data may be received on a regular basis, e.g., every 5 seconds, or in an event-driven manner, e.g., upon recognizing a movement of the movable entity by one of the sensor devices.

According to some illustrative embodiments, the first data being particular to the first time slot is deleted from any one of the sensor device after expiration of the first time slot. In case the first data was synchronized with or generated by the central server, the first data is also removed from the central server. Thus, it is ensured that the identifying value can never be restored from the derivative identifying data even in case the derivative identifying data would be retrieved by an unauthorized subject. A comparison of sensitive biometric data is never possible as the received sets of data are never available outside the sensor device before the data values particular to one of the time slots and being used as second input for the modifying function are invalidated.

An 'expired' data value is a data value not available within or outside the sensor device having used it for calculating the derivative identifying data. As two derivative identification data having been calculated for the same movable entity, but based on different second input values, will return dissimilar derivative identifier values, an extra level of security is provided by deleting the first data from the sensor devices: even in the case of an unauthorized access to the sensor devices, the first data of all time slots except for the most current ones are deleted and cannot be used for tracking purposes. By deleting also the hash values from the sensor devices after they have been sent to the server, a further level of protection is provided. Depending on the embodiment, the deletion of the data particular to a time slot may be executed immediately upon expiration of the first time slot or may be deleted after the expiration of, e.g., a sliding window of 1, 2, . . . or k time slots. Sending hash values calculated for the same identifying data based on multiple different time slot specific first data allows extended comparison across time slots.

According to further illustrative embodiments, the computer implemented method comprises:

h) repeating the steps c) to f) n times during the first time slot, n being an integer larger than 2, thereby receiving n sets of data from the movable entity and calculating for each of the n received sets of data and for the first time slot at least one respective first hash value, wherein for the calculation of each of the n first hash values the respectively received set of data was used as input;

i) storing each of the n first hash values on a storage medium of the first sensor device;

j) determining by the first sensor device that the first time slot has expired; and k) upon the determination, executing step g), wherein the message comprises the n first hash values.

These features may be advantageous in that the plurality of hash values allows for a highly accurate path assembly on the server side without transmitting sensitive biometric data to the server. The level of security is increased by deleting the hash values from the sensor devices to prevent unauthorized assignment of hash values to biometric data which may be stored temporally in the sensor device.

According to further illustrative embodiments, the computer implemented method comprises: repeating the steps a) to g) for each of j time slots, j being an integer larger than 3, thereby receiving one or more sets of data for each of the j time slots and calculating one or more further hash values for each of the j time slots. For the calculation of each further hash value of the same time slot, the same first data particular to the time slot is used. The one or more further hash values are stored in a storage medium of the first sensor device. After having sent the message created for any one of the j time slots, deleting all hash values having been calculated for an m-last time slot and any time slot preceding the m-last time slot are deleted. Thereby, m is an integer larger than 0 and smaller than j. In one illustrative embodiment, m is 4, corresponding to a sliding window of 3 (m−1) valid time slots. All hashes and data values particular to an invalid time slot, i.e. a time slot being at least as old as the $m^{th}$ time slot are deleted. According to some illustrative embodiments, the m−1 valid time slots constitute a sliding window of valid time slots. The number m and the duration of each time slot may be chosen in accordance with the requirements of each individual use case scenario. For example, in the case of a customer is expected to stay in a shop for no longer than 2 hours, a time slot duration of half the time (1 hour) is preferentially chosen, the sliding window comprising (m−1)=3 valid time slots.

According to further illustrative embodiments, the computer-implemented method further comprises a step of determining, by the first sensor device, one or more parameter values for the received set of data. The one or more parameter values are selected, in any combination, from a group of parameter values comprising:
  a timestamp information being indicative of a moment in time when the set of data was received;
  a parameter value of the movable entity, the parameter being automatically derived by the first sensor device by evaluating the received set of data; depending on the embodiment, the parameter may be, for example and without limitation, the gender, the ethnic group, an age range or the like in case of humans, a car type in case of electronic toll systems, or the like;
  a property of the first sensor device; the property may be, for example and without limitation, the location of the first sensor device.

The sent message in addition comprises the one or more determined parameter values. These features may be advantageous in that these additional parameters may allow the central server receiving the message to automatically determine if it is physically possible or plausible that a particular person has moved from a first sensor device to another sensor device within a time span given by the time stamps of two messages comprising identical or similar hash values. Thus, in the case of, for example, a path assembly module on the server being about to erroneously assign two similar hash values received from two different sensor devices to one and the same data object (representing the same person), the additional parameters may allow to exclude such an assignment, as it may be physically impossible for a person to move from the first to the second sensor device within the given time. The two hash values therefore have to belong to different persons and generate two different tracks.

According to some illustrative embodiments, the step of providing the first data comprises the steps of: generating by the central server random data; and sending the random data to each of the one or more sensor devices via a network.

According to embodiments the modifying function is selected from a group comprising: a morphing function, a 'warping' function; a swirl function, or any other image distortion function; or an acoustic distortion function. A plurality of modifying functions exists in the art and the functions may be used individually or in any combination with each other for calculating the derivative identifying data.

According to some illustrative embodiments, the one or more movable entities are humans, the one or more sensor devices are cameras, the received set of data is an image taken from the at least one human by one of the cameras, and wherein the identifying data is a face-print or thermal print of the at least one human. According to further embodiments, the one or more movable entities are humans, the one or more sensor devices are microphones, the received set of data is a voice record from one of the humans by one of the microphones, and wherein the identifying data is a voice profile of the human. According to further illustrative embodiments, the one or more movable entities are vehicles, the one or more sensor devices are cameras or radar sensors, the received set of data is image data of the vehicle's number plate, and the number specified on the plate is the car's identifying data.

In a further aspect, the illustrative embodiments of the present invention relate to a computer-implemented method for tracking one or more movable entities, the method comprising:
  receiving by a central server a first message from a first one of the one or more sensor devices, the first message comprising a first hash value, an identifier of the first sensor device and a first timestamp information;
  evaluating the identifier of the first sensor device for determining a first location, the first location being the location of the first sensor device;
  assigning the first location and the first timestamp information to a first data object, the first data object representing a first one of the one or more movable entities;
  receiving by the central server at least one second message from the first or a second one of the one or more sensor devices, the at least one second message comprising a second hash value, a second identifier of the first or second sensor device and a second timestamp information;
  evaluating the second identifier for determining a second location, the second location being the location of the first or second sensor device having sent the second message;
  comparing the first hash value against the second hash value for determining a degree of similarity between the first and the second hash values;
  in case the determined degree of similarity is below a threshold value, assigning the second location and the second timestamp information to a second data object representing a second one of the movable entities;
  in case the determined degree of similarity is equal or above the threshold value, assigning the second location and the second timestamp information to the first data object;
  storing the first and/or second data object in a data storage of the central server, thereby tracking the movement of the movable entity represented by the first and/or second movable entity object.

These steps may be executed by a software module running on a central server device being connected to the one or more sensor devices. The stored data object has assigned the time and place information contained in the received message and may be accessible via a unique key. According to some illustrative embodiments, the hash value in each of the received messages is deleted after having completed the comparison. Thus, only the location and time of the received message and, according to some embodiments, also the parameter values having been received by the corresponding message (e.g., age group, gender, dwell time, timestamp and the like, but not the hash value) are assigned to the data objects and stored.

According to some illustrative embodiments, the message received by the central server comprises multiple hash values (e.g., a first and k second hash values), the message being indicative of the hash values having been derived from one and the same received set of data. As the hash values were calculated for the same movable entity, but based on different time-slot specific first data, they are dissimilar but nevertheless are linked to each other based on the explicit indication. This indication may be used for linking dissimilar hash values having been calculated during different time slots together for assembling a path of one of the movable entities.

According to some illustrative embodiments, the first message comprises one or more first ones of a plurality of parameter values. Each of the at least one second messages comprises one or more second ones of the parameter values. Executing the comparison further comprises the steps of: evaluating the one or more first parameter values and the one or more second parameter values; in case the evaluation of the first and second parameter values indicates that the parameters of the first message stem from another one of the movable entities than the parameters of the at least one second message, assigning the second location and the second timestamp information to the second data object even in case the determined degree of similarity is above the threshold value.

These features may be advantageous in that erroneous assignments of the locations of the first and the second sensor devices to the same data object can be prevented by evaluating the plausibility and physical feasibility of a corresponding movement of the mobile entity from the first to the second sensor in a given time period. According to some illustrative embodiments, various external and server-system-internal data sources can be used as input for evaluating the parameter values and other data values contained in the received messages for determining the plausibility that both messages are indicative of the same movable entity. For example, building plans comprising a specification of locked and unlocked doors may be retrieved as external data and used in the evaluation. If two sensor devices, from which a first and a second message was received, are separated by a locked door, and in the case where the time between receiving the two messages was too short as to allow the movable entity making a detour to move from the first to the second sensor device (the time might have been sufficient in case of an unlocked door), it can be determined that the hash values in the first and second messages cannot stem from the same movable entity. Thus, any kind of data providing some constraints to the freedom of movement of the movable entities (regarding time aspect, e.g., the maximum possible movement speed of the entities, and/or spatial aspects such as building plans, street maps, and the like) may be used as additional input for evaluating a plausibility that the hash value of two different messages is indicative of the same movable entity.

In a further aspect of illustrative embodiments of the present invention, a computer-readable storage medium is provided comprising computer-interpretable instructions which, when executed by a processor, cause the processor to execute a method according to anyone of the above illustrative embodiments.

In a further aspect of illustrative embodiments of the present invention, a sensor device for tracking at least one movable entity is provided, the sensor device comprising:
 a clock for determining a current time, the current time lying within a first time slot, the first time slot being one of a series of time slots, the clock being adapted for synchronizing the clock with clocks of one or more further sensor devices;
 a controller module being adapted for sharing the series of time slots with all other sensor devices; and providing first data, the first data being particular to the first time slot and being shared with all other first time slots of the sensor devices;
 a first interface being adapted for receiving a set of data, the set of data being received from the at least one movable entity;
 a calculation unit, the calculation unit being adapted for
  calculating identifying data from the received set of data for identifying the at least one entity by means of the identifying data;
  calculating a derivative identifying data by applying a modifying function on the identifying data, the modifying function using the identifying data as first input value and using the provided first data as a second input value for modifying the identifying data; and
  calculating a first hash value by taking the derivative identifying data as input, the first hash value being calculated by applying a hash function;
 a second interface being adapted for sending a message from the first sensor device to a central server for determining the position of the at least one movable entity, the message comprising the hash value and an identifier of the first sensor device.

In a further aspect of illustrative embodiments of the present invention, a computer system is provided comprising:
 a central server, the central server comprising:
  a data storage;
  a first interface adapted for receiving a first message from a first one of one or more sensor devices, the first message comprising a first hash value and an identifier of the first sensor device, the first message comprising a first timestamp information;
  a path assembly module, the path assembly module being adapted for:
   evaluating the identifier of the first sensor device for determining a first location, the first location being the location of the first sensor device;
   assigning the first location and the first timestamp information to a first data object, the first data object representing a first one of the one or more movable entities;
   receiving by the central server at least one second message from the first or a second one of the one or more sensor devices, the at least one second message comprising a second hash value and a second identifier of the first or second sensor device, the at least one second message comprising a second timestamp information;
   evaluating the second identifier for determining a second location, the second location being the location of the first or second sensor device having sent the second message;
   comparing the first hash value against the second hash value for determining a degree of similarity between the first and the second hash values;
   in case the determined degree of similarity is below a threshold value, creating a second data object representing a second one of the movable entities; and assigning the second location and the second timestamp information to the second data object;

in case the determined degree of similarity is equal or above the threshold value, assigning the second location and the second timestamp information to the first data object; and storing the first and/or second data object in the data storage of the central server, thereby tracking the movement of the movable entity represented by the first and/or second data object.

According to further illustrative embodiments, the assembled path and/or the hash values received by the central server may be used, e.g., by a path evaluation module running on the central server, for various purposes. According to an illustrative embodiment, an organization, e.g., a mall may position one or more first sensor devices within or next to the entrance of lifts and may position one or more second sensor devices within or next to the entrance of escalators. A third sensor device may be positioned outside the mall for taking images of passerbys looking at an ad presented in a window of the mall. The path evaluation module may evaluate one or more paths of persons provided by a path assembly module to determine if and which kind of persons (male, female, age group) enter the mall after having looked at the ad in the window. The path evaluation module may determine if the fraction of the persons entering the mall and using a lift reach the advertised good faster than the fraction of persons using an escalator.

With reference now to the figures, in the following, like numbered elements in the figures are either similar elements or perform an equivalent function. Elements which have been discussed previously will not necessarily be discussed in later figures if the function is equivalent.

Figure 2:
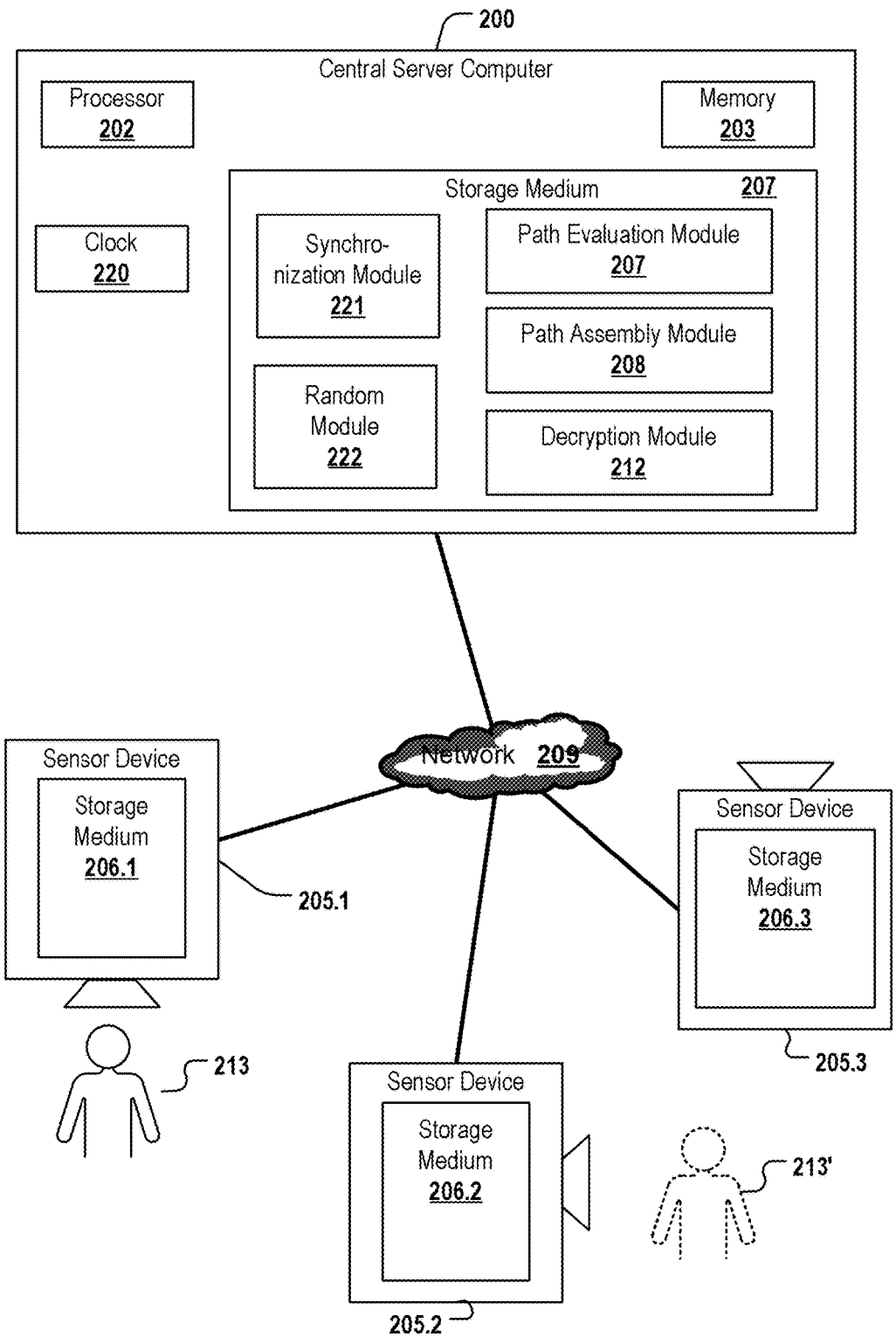
FIG. 2 is an example block diagram of a system in which aspects of the illustrative embodiments may be implemented.
Figure 3:
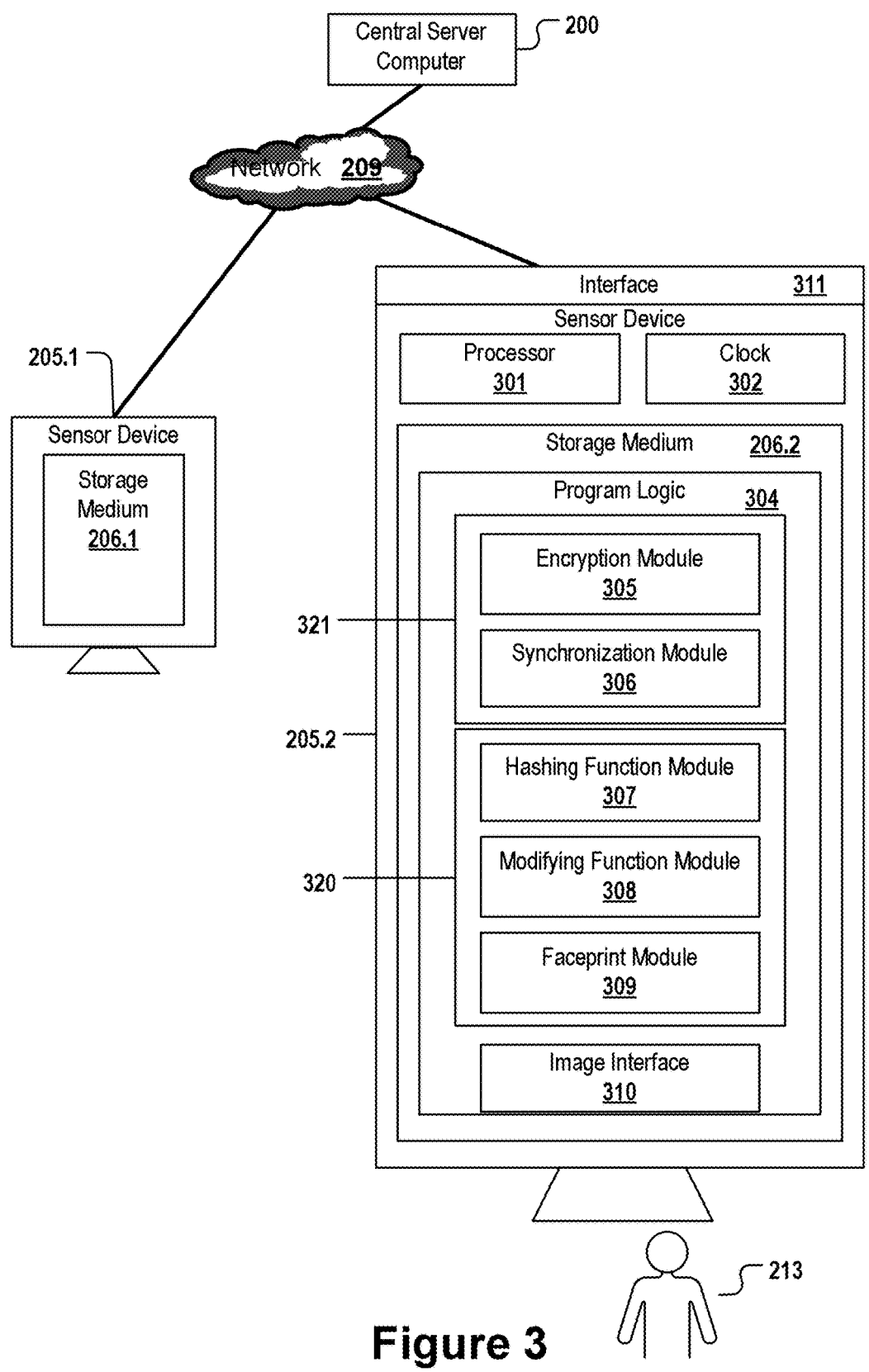
FIG. 3 is an example block diagram showing one of the sensor devices and its components in greater detail in accordance with one illustrative embodiment.

FIG. 1 shows a method to be executed by a sensor device 205.1, 205.2, and/or 205.3 as depicted in FIGS. 2 and 3. In a first determination step 101, the sensor device, e.g., a camera, determines a current time by means of a clock. The clock may be an internal clock or maybe functionality provided by the central server 200 continuously sending synchronized time signals to each of the sensor devices. The current time determined by the clock of the sensor device lies within a first time slot. The time slot belongs to a series of time slots. This series of time slots is shared by all the sensor devices. This means that the beginning and the end of each of the time slots is identical to the beginning and the end of a corresponding time slot of a corresponding series of time slots managed by one of the other sensor devices.

In a providing step 102, the sensor device provides first data being particular to the first time slot (the current time slot), the first data being shared between all first time slots of all the sensor devices. For example, the data may be generated by the sensor device and sent to all other sensor devices for using the sent data as the first data of a corresponding first time slot of a time slot series shared by all the sensor devices.

In a receiving step 103, a set of data is received from the at least one movable entity. The received set of data can be, for example, image data taken by a camera from the face of a human person.

In step 104, the sensor device calculates an identifying data from the received set of data for identifying the at least one movable entity by means of the identifying data. For example, a face print is calculated from the originally received image data by evaluating parameters of some characteristic regions of a person's face, e.g., the distance between the two eyes, the size and position of the nose, and the like. A face print still comprises enough information for identifying one individual person. Therefore, the originally received first data, and the face print calculated therefrom, are sensitive biometric data which need to be protected.

In a further calculations step 105, derivative identifying data is calculated by applying a modifying function on the identifying data. Thereby, the modifying function uses the first data (e.g., a random number) particular to the first time slot to modify the identifying data for generating the derivative identifying data. The derivative identifying data may still comprise enough information for identifying the person from whom the biometric data was collected, provided the random number is known.

In a third calculation step 106, the sensor device calculates a first hash value by applying a continuous hash function on the derivative identifying data. The calculated hash value does not comprise any information from which the original biometric data could be restored or used otherwise in order to identify the person. In a sending step 107, a message is sent from the sensor device to a central server computer 200 for determining the position of the at least one movable entity, e.g., the person, from which the set of data was received. The message comprises the hash value and an identifier of the sensor device. As the hash value does not provide any information allowing the identification of the person, sending the hash value via a network to a central computer system does not violate data protection rules.

FIG. 2 shows a central computer system 200 comprising a processor 202, a memory 203, and a clock 220. The central server computer 200 further comprises a storage medium 207, the storage medium comprising computer interpretable instructions for providing a plurality of modules. A decryption module 212 is operable to receive a message from one of the sensor devices 205.1-205.3 via a network 209 and to decrypt the content of the message. A random module 222 may generate a unique random data for each of the time slots synchronized between the sensor devices and send the random data via the network to each of the sensor devices. According to some illustrative embodiments, as shown for example in FIG. 3, a random module 222 may alternatively be a component of each of the sensor devices.

In any case, it is necessary that the synchronization of the generated random data between all the sensor devices is ensured. The synchronization may be executed by a synchronization module 221 which may send a unique random number generated by the random module 222 to all the sensor devices. A path assembly module 208 may receive a plurality of messages from a plurality of sensor devices 205.1-205.3, each of the messages comprising an identifier of the sending sensor device and one or more hash values generated by a continuous hash function. The path assembly module 208 compares hash values having been received from one or more of the sensor devices with each other in order to determine hash values having a high degree of similarity. Hash values having a high degree of similarity are considered as hash values having been derived from the same person and are accordingly mapped to one single data object representing the person. Each of the messages may, in addition, comprise a timestamp, the timestamp being indicative of the time of taking the image, sending the message by one of the sensor devices, or the time of receiving the message by the central server computer. Thus, by comparing the hash values of the messages, and by evaluating the timestamps contained in the received messages, the path assembly module 208 is operable to determine at which location (at which of the plurality of cameras) a particular person corresponding to a particular hash value was at the moment when the image (and the corresponding face print and hash value) was taken by one of the cameras 205.1-

205.3. Thus, the path assembly module can assemble a path of a person moving from an area supervised by one camera to other areas monitored by other cameras.

The path can be evaluated by a path evaluation module 207 for various purposes. For example, a motion path can be used for determining if a particular person watching an advertisement in a shop window indeed walks to a shelf of the store comprising the advertised good. The path evaluation module 207 may be operable to determine if a particular person remained for a minimum time period in front of a window of a shop for looking at an advertisement. The movement path of that person may be used at runtime for showing advertisement for goods being identical or similar to the good watched in the window in runtime, for example, when the person enters the shop and passes by an advertisement screen. In addition or alternatively the screen may display to the person information such as the location and/or price of the advertised good in the shop.

Each of the sensor devices 205.1-205.3 comprises a storage medium 206.1-206.3. The sensor devices depicted in FIG. 2 may be cameras operable to take an image of the face of a person 213. In a first moment of time, the person 213 may stand in front of sensor device 205.1. Then, the person may change his/her position and then stay in front of sensor device 205.2 as indicated by the dotted silhouette of the person 213'.

FIG. 3 shows the sensor device 205.2 in greater detail. The sensor devices may be cameras, e.g., a camera of type SEKS204, initialized according to the illustrative embodiments described herein to generate a sequence of pseudo-random numbers respectively corresponding to a time slot, the pseudo-random numbers and the time slots being shared by all of the cameras. Each sensor device comprises a processor 301 for processing program logic 304 stored to storage medium 206.2. The sensor device further comprises a clock 302 for determining the current time. The program logic 304 comprises multiple functional modules for generating a message to be sent via network 209 to the central server computer 200. The network communication may be based, for example, on an XML-IP Ethernet protocol. An image taken by the camera is received by the program logic 304 via image interface 310. The image may comprise biometric data, e.g. the image of a face of a human person 213.

The face print module 309, belonging to a calculation module 320, takes the image of the face as input for generating a face print (the face print is one example of identifying data). The face print comprises information on particular features and patterns of the face of the human person and can be used for identifying the person. The face print comprises less data than the original image but it still is a form of biometric data which needs to be protected from unauthorized access.

A modifying function module 308 applies a modifying function on the face print generated by module 309. The modifying function uses a first data value being particular to the current time slot of a series of time slots in order to create a derivative face print (a derivative identifying data). The derivative face print is thus calculated based on a first data value being particular to the current time slot. Once the first data value is invalidated, it is not possible to restore the original face print from the derivative face print. As long as the first data value is valid, and provided the data value and corresponding time slot is shared by all of the sensor devices, the derivative face prints of one and the same human being taken by different cameras are identical or at least highly similar to each other. As soon as the data value is invalidated, is not possible to restore the original face print anymore.

The synchronization module 306, a component of controller module 321, may take care of synchronizing the current time and/or the data value particular to each time slot among all the sensor devices by sending and receiving a responding synchronization signals. The hashing function module 307 applies a continuous hashing function on the derivative face print of person 213, thereby calculating a hash value. The encryption module 305 encrypts the hash value before the hash value is sent, by interface 311, as part of a message via network 209 to the central server computer 200.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented method, performed in a first sensor device, for tracking a movable entity, wherein the movable entity is a physical entity within a physical space, the method comprising:
   a) synchronizing, with one or more other sensor devices, a first data value corresponding to a first time slot associated with a current time, the first time slot being one of a series of time slots shared by all the sensor devices;
   b) generating a set of data based on sensing of one or more attributes of the movable entity, wherein the set of data is uniquely identifiable data that uniquely identifies the movable entity;
   c) calculating identifying data from the generated set of data for identifying the movable entity based on the identifying data, wherein the identifying data is a reduced size set of data relative to the generated set of data and is directed to identifying characteristics of the movable entity within the generated set of data;
   d) calculating derivative identifying data by applying a modifying function on the identifying data, the modifying function using the identifying data as first input value and using the first data value as a second input value for modifying the identifying data based on the first data value, wherein the derivative identifying data is anonymized data which does not uniquely identify the movable entity;
   e) calculating a first hash value at least by applying a hash function to the derivative identifying data; and
   f) sending a message from the first sensor device to a central server for determining the position of the movable entity, the message comprising the hash value and an identifier of the first sensor device.

2. The computer-implemented method according to claim 1, the method further comprising encrypting the message before sending the message to the central server.

3. The computer-implemented method according to claim 1, wherein the hash function is operable to calculate, for any pair of two similar input values, a pair of similar output values, whereby a degree of similarity of said pair of input values correlates with a degree of similarity of said pair of output values.

4. The computer-implemented method according to claim 1, the method further comprising, for k second time slots preceding the first time slot in the series of time slots, k being an integer larger than 1, the following:
  determining one of the k second time slots, the determined second time slot preceding a current time slot;
  providing other first data, the other first data being particular to the determined second time slot and being shared between the sensor devices;
  calculating a second derivative identifying data by applying a modifying function on the identifying data, the modifying function using the identifying data as first input value and using the provided other first data as a second input value for modifying the identifying data;
  calculating by said first sensor device a second hash value at least by applying the hash function to the second derivative identifying data; and
  tracking a motion of the movable entity across the k second time slots and the first time slot by comparing the first hash value and each of the k second hash values.

5. The computer-implemented method according to claim 1, wherein the first data is first random data and wherein synchronizing the first data comprises executing a random function based on a time value corresponding to the first time slot, on the first sensor device.

6. The computer-implemented method according to claim 1, the method further comprising:
  g) repeating the operations b) to e) n times, n being an integer larger than 2 during the first time slot, thereby receiving n sets of data from the movable entity and calculating for each of said n received sets of data and for the first time slot a respective first hash value, wherein for the calculation of each of said n first hash values the respectively generated set of data was used as input;
  h) storing each of the n first hash values on a storage medium of the first sensor device;
  i) determining by said first sensor device that the first time slot has expired; and
  j) upon said determination, executing operation f), wherein the message comprises said n first hash values.

7. The computer-implemented method according to claim 1, the method further comprising:
  repeating the steps a) to f) for each of j time slots, j being an integer larger than 3, thereby receiving one or more sets of data for each of the j time slots and calculating one or more further hash values for each of said j time slots, wherein for the calculation of each further hash value of one of said j time slots the same first data is used, wherein the one or more further hash values are stored in a storage medium of the first sensor device; and
  after having sent the message created for each one of the j time slots, deleting all hash values having been calculated for the m-last time slot and any time slot preceding said m-last time slot, wherein m is an integer larger than 0 and smaller than j.

8. The computer-implemented method according to claim 1, the method further comprising:
  determining, by said first sensor device, one or more parameter values for the generated set of data, the one or more parameter values being selected, in any combination, from a group of parameter values comprising:
    a timestamp information being indicative of a moment in time when the set of data was generated;
    a parameter value of the movable entity, said parameter being automatically derived by the first sensor device by evaluating the generated set of data; and
    a property of the first sensor device, wherein the sent message in addition comprises the one or more determined parameter values.

9. The computer-implemented method according to claim 1, wherein synchronizing the first data comprises:
  generating, by the central server, the first data as a random data value; and
  sending, by the central server, the first data to each of the sensor devices via a network.

10. The computer-implemented method according to claim 1, wherein:
  the movable entity is a human being, the sensor devices are cameras, the generated set of data is an image taken of the human being by the first sensor device, and wherein the identifying data is a face-print or thermal print of the human being; or
  the movable entity is a human being, the sensor devices are microphones, the generated set of data is a voice record from the human being recorded by the first sensor device, and wherein the identifying data is a voice profile of the human being.

11. The computer-implemented method of claim 1, wherein the movable entity is a vehicle, the one or more sensor devices are cameras or radar sensors, the generated set of data is image data of the vehicle's number plate, and the number specified on the vehicle's number plate is the identifying data.

12. A sensor device for tracking at least one movable entity, the sensor device comprising:
  a clock for determining a current time, the current time lying within a first time slot, the first time slot being one of a series of time slots, the clock being adapted for synchronizing the clock with clocks of one or more other sensor devices;
  a controller module being adapted for:
    synchronizing, with one or more other sensor devices, a first data value corresponding to the first time slot;
  a first interface being adapted for generating a set of data based on sensing one or more attributes of the movable entity, wherein the set of data is uniquely identifiable data that uniquely identifies the movable entity;
  a calculation unit, the calculation unit being adapted for:
    calculating identifying data from the generated set of data for identifying the movable entity based on the identifying data, wherein the identifying data is a reduced size set of data relative to the generated set of data and is directed to identifying characteristics of the movable entity within the generated set of data;
    calculating derivative identifying data by applying a modifying function on the identifying data, the modifying function using the identifying data as first input value and using the first data value as a second input value for modifying the identifying data based on the first data value, wherein the derivative identifying data is anonymized data which does not uniquely identify the movable entity; and
    calculating a first hash value at least by applying a hash function to the derivative identifying data; and
  a second interface being adapted for sending a message from the first sensor device to a central server for indicating the position of the movable entity, the message comprising the hash value and an identifier of the first sensor device.

13. A computer program product comprising a non-transitory computer readable medium having a computer readable program stored therein, wherein the computer readable program, when executed on a computing device, causes the computing device to:
   a) determine synchronizing, with one or more other sensor devices, a first data value corresponding to a first time slot associated with a current time, the first time slot being one of a series of time slots shared by all the sensor devices;
   b) generate a set of data based on sensing of one or more attributes of the movable entity, wherein the set of data is uniquely identifiable data that uniquely identifies the movable entity;
   c) calculate identifying data from the generated set of data for identifying the movable entity based on the identifying data, wherein the identifying data is a reduced size set of data relative to the generated set of data and is directed to identifying characteristics of the movable entity within the generated set of data;
   d) calculate derivative identifying data by applying a modifying function on the identifying data, the modifying function using the identifying data as first input value and using the first data value as a second input value for modifying the identifying data based on the first data value, wherein the derivative identifying data is anonymized data which does not uniquely identify the movable entity;
   e) calculate a first hash value at least by applying a hash function to the derivative identifying data; and
   f) send a message from the first sensor device to a central server for determining the position of the movable entity, the message comprising the hash value and an identifier of the first sensor device.

14. The computer program product according to claim 13, wherein the computer readable program further causes the computing device to encrypt the message before sending the message to the central server.

15. The computer program product according to claim 13, wherein the hash function is operable to calculate, for any pair of two similar input values, a pair of similar output values, whereby a degree of similarity of said pair of input values correlates with a degree of similarity of said pair of output values.

16. The computer program product according to claim 13, wherein the computer readable program further causes the computing device, for k second time slots preceding the first time slot in the series of time slots, k being an integer larger than 1, to perform the following:
   determine one of the k second time slots, the determined second time slot directly preceding a current time slot;
   provide other first data, the other first data being particular to the determined second time slot and being shared between the sensor devices;
   calculate a second derivative identifying data by applying a modifying function on the identifying data, the modifying function using the identifying data as first input value and using the provided other first data as a second input value for modifying the identifying data;
   calculate by said first sensor device a second hash value at least by applying the hash function to the second derivative identifying data; and
   track a motion of the movable entity across the k second time slots and the first time slot by comparing the first hash value and each of the k second hash values.

17. The computer program product according to claim 13, wherein the first data is first random data and wherein synchronizing the first data value comprises executing a random function based on a time value corresponding to the first time slot, on the first sensor device.

18. The computer program product according to claim 13, wherein the computer readable program further causes the computing device to:
   g) repeat the operations b) to e) n times, n being an integer larger than 2 during the first time slot, thereby receiving n sets of data from the movable entity and calculating for each of said n received sets of data and for the first time slot a respective first hash value, wherein for the calculation of each of said n first hash values the respectively generated set of data was used as input;
   h) store each of the n first hash values on a storage medium of the first sensor device;
   i) determine by said first sensor device that the first time slot has expired; and
   j) upon said determination, executing operation g), wherein the message comprises said n first hash values.

19. The computer program product of claim 13, wherein the movable entity is a vehicle, the one or more sensor devices are cameras or radar sensors, the generated set of data is image data of the vehicle's number plate, and the number specified on the vehicle's number plate is the identifying data.

20. A computer system comprising: a centralized server;
   a plurality of sensors coupled to the centralized server by one or more data networks, wherein at least one sensor in the plurality of sensors operates to:
   synchronize, with one or more other sensor devices, a first data value corresponding to a first time slot associated with a current time, the first time slot being one of a series of time slots shared by all the sensor devices;
   generate a set of data based on sensing of one or more attributes of the movable entity, wherein the set of data is uniquely identifiable data that uniquely identifies the movable entity;
   calculate identifying data from the generated set of data for identifying the movable entity based on the identifying data, wherein the identifying data is a reduced size set of data relative to the generated set of data and is directed to identifying characteristics of the movable entity within the generated set of data;
   calculate derivative identifying data by applying a modifying function on the identifying data, the modifying function using the identifying data as first input value and using the first data value as a second input value for modifying the identifying data based on the first data value, wherein the derivative identifying data is anonymized data which does not uniquely identify the movable entity;
   calculate a first hash value at least by applying a hash function to the derivative identifying data; and
   send a message from the first sensor device to a central server for determining the position of the movable entity, the message comprising the hash value and an identifier of the first sensor device.

21. The computer system of claim 20, wherein the centralized server operates to track a motion of the movable entity by comparing hash values calculated for time slots in the series of time slots.

* * * * *